May 30, 1967

F. M. INGRAM 3,321,894

ROTARY BLADE STRUCTURE

Filed Dec. 3, 1964

INVENTOR.
FLOYD M. INGRAM

BY Rudolph L. Lowell

ATTORNEY.

United States Patent Office 3,321,894
Patented May 30, 1967

3,321,894
ROTARY BLADE STRUCTURE
Floyd M. Ingram, 110 Evans St.,
Sioux Rapids, Iowa 50585
Filed Dec. 3, 1964, Ser. No. 415,707
1 Claim. (Cl. 56—295)

This invention relates to a shock absorbing blade assembly for use on rotary lawn mowers in which a rotary blade is carried by an upright rotating shaft.

Conventional rotary lawn mower blades now on the market are made of a flat elongated sheet steel approximately ⅛ to ¼ of an inch thick with cutting edges formed by grinding diagonally opposite side edges of the blade. The conventional blade thus has a cutting edge thickness equal to that of the blade, is relatively non-flexible, and imparts a tremendous force on the rotating shaft upon hitting an obstacle. The shock transmitted to the shaft frequently results in damage to the shaft or to the drive unit for the shaft.

Special shock absorbers and/or slip clutches therefor, are normally used with such lawn mower blade structure to absorb and relieve the shock force transmitted to the shaft. However, even these devices have not proved to be entirely satisfactory in preventing shaft damage.

The general object of this invention is to provide a new and improved blade cutter assembly in which the blade on striking an obstruction is deflected above or below the object.

Another object is to provide a blade assembly with a central plate section and cutting portions in which the cutting portions are easily detachable for replacement or sharpening purposes and are formed of a thin spring steel material so as to be deflected on striking an obstruction.

A further object is to provide a novel clamp device that rigidly secures the cutting portions to the central plate section, allows quick removal of the cutting portions, and allows deflection of the cutting portions about the clamp and central plate section to absorb shock or impact loads encountered by the blade.

A still further object is to provide a blade structure having detachable cutting portions which are readily adjustable to accommodate a large range of lawn mower sizes.

Other objects and advantages of the invention will become apparent from the following detailed description taken in connection with the accompanying drawings, in which.

Figure 1:
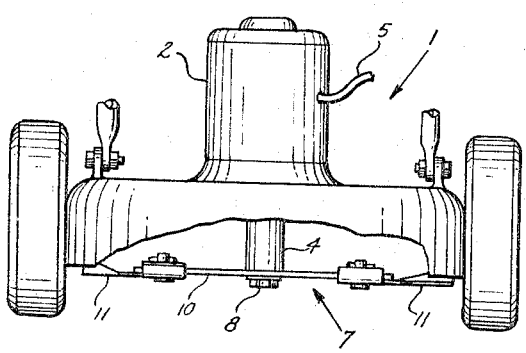
FIG. 1 is a perspective view of the invention mounted on a lawn mower structure with the blade guard broken away in part.

As shown in FIG. 1, the invention may be embodied in a conventional electric lawn mower 1 having a motor 2 with a drive shaft 4 and plug-in cord 5. The blade assembly 7 is secured to the lower end of the shaft 4 by a bolt inserted through the blade assembly 7 and threadable into the shaft. Although the blade assembly is shown mounted on an electric lawn mower, it is understood that the specific blade structure herein disclosed may be mounted on any type of rotary cutting tool.

Figure 2:
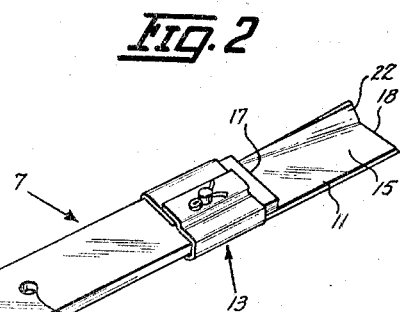
FIG. 2 is a perspective view of the blade structure.

The blade assembly as shown in FIG. 2, consists of a flat and elongated support plate or central member 10 having attached to its opposite ends flexible cutter blades or end sections 11. A connecting or clamp means 13 is used to secure a blade section 11 to the support plate 10 in an overlapping or back-to-back relationship.

A center hole 20 in the support plate 10 receives the bolt 8 whereby the blade assembly 7 is securely connected to the shaft 4 for rotation therewith. The outer end or connecting sections 24 of the central member 10 are formed with a plurality of longitudinally spaced adjusting holes 25 in linear alignment with hole 20.

Figure 3:
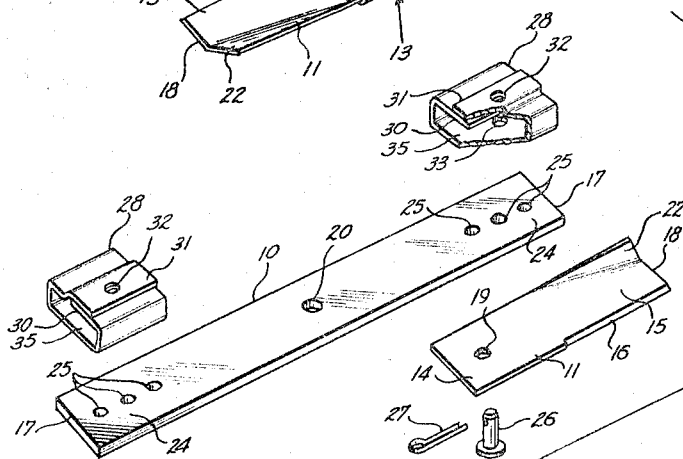
FIG. 3 is an exploded perspective view of the blade structure.

A cutter blade 11 (FIG. 3) is of a flat elongated shape formed of thin spring steel material and having a support portion 14 and a cutting section 15. A sharpened knife edge 16 is formed on the leading side of the cutting section 15. As best appears in FIG. 2, the cutting section 15 is characterized as that portion of a blade 11 which extends from the outer edge 17 of the central member 10 to the outer edge 18 of a blade 11. The remainder of the blade, which is in overlapping relation with the central member when assembled, constitutes the support portion 14. A connecting hole 19 is formed in the support portion and, upon assembly, is in linear alignment with the hole 20 and the adjusting holes 25 in support plate 10. The bent surface 22 of a cutter blade 11, as is well known, is for the purpose of creating an upward pull or draw on the grass to be cut to facilitate the cutting operation of the blade assembly 7.

A connecting means 13 consists of a pin 26, a cotter pin 27, and a tubular-shaped body or clamp member 28 formed from a flat piece of material with the opposite end sections 30 and 31 arranged in an overlapping relation. A hole 32 is extended through the overlapped sections in alignment with a hole 33 formed in the side 35 of the body member 28.

Since the blade portions 11 are of similar construction and assembled in a like manner by a corresponding connecting means 13 with the support plate 10, only one of such assemblies will be described in detail. In assembly a body member 28 is positioned about an outer section 24 of support plate 10 and a cutter blade 11 is inserted between the outer section and the side 35 of a body member 28. With a hole 25 of cutter blade 11, the holes 32, 33 in the connecting means and a selected one of the adjusting holes 25 in support plate 10 placed in axial alignment, a pin 26 is inserted therethrough to form a rigid blade assembly 7. The pin 26 is held against retraction by a cotter pin 27.

The internal bore in the body member 28 is of a size and shape to guidably receive in a snug fit the end section 24 and support portion 14 of the support plate 10 and cutter blade 11, respectively. As a result, the plate and blade are maintained in longitudinal alignment and against relative lateral movement so that the cutting section 15 constitutes an extension of the support plate. This relationship is maintained by the pin 26 which locks the blade 11 against longitudinal or radial movement relative to the support plate.

Figure 4:
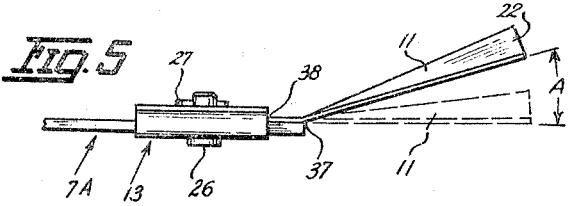
FIG. 4 is a fragmentary side view showing the cutting blade in changed positions.

By virtue of the extension of cutting section 15 longitudinally outwardly from support plate 10 and the forming of a cutter blade 11 of a thin spring steel material, the cutting section is resiliently deflectable in opposite directions laterally of the support plate. Thus a deflection in the upward direction results in a bending of a cutter blade 11 (FIG. 4) about the edge 37 of the support plate 10. Downward deflection results in a bending of a blade 11 about the clamp edge 38.

In the operation of one embodiment of the invention, an angle of deflection A between plus or minus 10–15° has been proven to provide the best non-vibrating, cutting, and shock absorbing characteristics. In such embodiment, a cutter blade 11 is formed of a spring steel material having a thickness of about .042" and a cutting section 15 is extended 3"–4" from the support plate 10 depending upon the adjusted position of the blade relative to the support plate.

Longitudinal adjustment of a blade 11 is accomplished by the multiple holes 25 so that a single blade assembly 7 can be used on a variety of different diameter lawn mowers. For example, assume a support plate 10 having a length of 14 inches with holes 25 spaced 1", 1½" and 2", respectively, from each end 17 and a cutter blade 11 having a length of 6 inches with a hole 19 spaced 5 inches from end 18 attached to each end of the support plate. This arrangement provides for the over-all length of the blade assembly 7 being adjustable over a two inch length for use on a 20", 21" or 22" lawn mower.

Figure 5:
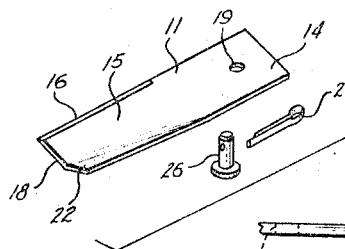
FIG. 5 is a view similar to FIG. 4 showing the cutting blade in a vertically changed position relative to its position in FIG. 4.

When mowing along graveled driveways or over an uneven terrain, it is desirable to protect the cutting blade from damage. This may be done by locating support portion 14 of the cutter blade 11 over the support plate 10 (FIG. 5) from the position shown in FIG. 4 to form a blade assembly 7a. This vertical adjustment is limited to the thickness of the support plate 10. As shown in FIG. 5 a deflection of cutter blade 11 in blade assembly 7a results in a bending of the blade about clamp edge 38 in the upward direction and about edge 37 of support plate 10 in the downward direction.

By virtue of the flexibility and relatively small thickness of the cutter blades 11, on striking objects such as stones, pieces of metal, or twigs, these objects are not as forcefully ejected or thrown by the blade assembly 7 as occurs with a conventional lawn mower blade assembly.

It will be understood that modifications and changes in the construction and arrangement of this invention can be made within the scope of what is claimed, without departing from the spirit and purpose thereof. It is thus intended to cover by the claim, a modified form of the structure or mechanical equivalents which may be reasonably included within its scope.

I claim:

A cutter assembly for a rotating blade-type mower having an upright power-operated shaft, comprising:

(a) a flat support bar having a connector section at each extremity, each connector section having a connector hole therethrough, (b) a pair of flat elongated cutting members each having a support portion and a cutting portion, (c) said cutting members made of a flat flexible spring steel material of a width substantially equal to the width of said support bar, each cutting member formed with a connecting hole in said support portion, (d) each cutting member having the support portion thereof positioned against one side of a connector section and the cutter portion thereof projected radially outwardly from a connector section, (e) a tubular clamp member surrounding each support portion and corresponding connector section, said clamp member being of a rectangular shape in transverse cross section and formed with aligned holes in opposite side portions thereof, and (f) a pin member placed through each connecting hole, aligned holes, and connector hole to secure each support portion against radial and transverse movement relative to a corresponding connector section, whereby radially extending cutting portions are laterally deflectable relative to said connector sections.

References Cited

UNITED STATES PATENTS

| | | | |
|---|---|---|---|
| 2,477,442 | 7/1949 | Cramer et al. | 56—295 X |
| 2,547,540 | 4/1951 | Roberts | 56—295 X |
| 3,184,903 | 5/1965 | Fjelstad | 56—295 X |
| 3,208,209 | 9/1965 | Dunlop et al. | 56—295 |

ABRAHAM G. STONE, *Primary Examiner.*

ANTONIO F. GUIDA, *Examiner.*